(12) United States Patent
Xia et al.

(10) Patent No.: US 8,831,102 B2
(45) Date of Patent: Sep. 9, 2014

(54) METHOD FOR PREDICTING A LOST OR DAMAGED BLOCK OF AN ENHANCED SPATIAL LAYER FRAME AND SVC-DECODER ADAPTED THEREFORE

(75) Inventors: Zhi Jin Xia, Beijing (CN); Zhi Bo Chen, Beijing (CN); Yu Wen Wu, Beijing (CN)

(73) Assignee: Thomson Licensing, Boulogne, Billancourt (FR)

( * ) Notice: Subject to any disclaimer, the term of this patent is extended or adjusted under 35 U.S.C. 154(b) by 682 days.

(21) Appl. No.: 12/460,960

(22) Filed: Jul. 27, 2009

(65) Prior Publication Data
US 2010/0034273 A1 Feb. 11, 2010

(30) Foreign Application Priority Data

Aug. 6, 2008 (EP) .................................. 08305451

(51) Int. Cl.
*H04N 7/12* (2006.01)
*H04N 7/50* (2006.01)
*H04N 7/26* (2006.01)
*H04N 7/68* (2006.01)

(52) U.S. Cl.
CPC ... *H04N 19/00781* (2013.01); *H04N 19/00909* (2013.01); *H04N 19/00436* (2013.01); *H04N 19/00278* (2013.01); *H04N 19/0089* (2013.01); *H04N 19/00939* (2013.01)
USPC .................................................... 375/240.16

(58) Field of Classification Search
USPC ......................................... 375/240.01, 240.16
See application file for complete search history.

(56) References Cited

U.S. PATENT DOCUMENTS

| 6,510,177 B1 * | 1/2003 | De Bonet et al. ........ 375/240.16 |
| 7,688,897 B2 * | 3/2010 | Park et al. ................ 375/240.25 |

(Continued)

FOREIGN PATENT DOCUMENTS

| EP | 1 775 954 A1 | 4/2007 |
| JP | 2006513633 | 4/2006 |

(Continued)

OTHER PUBLICATIONS

Sun H et al.: Error Concealment Algrithms for Robust Docding of MPEC Compressed Video Signal Processing. Image Communication, Elsevier Science Publishers, Amsterdam, NL, vol. 10, No. 4, Sep. 1, 1997, pp. 249-268, XP004091243 ISSN: 0923-5965.

(Continued)

*Primary Examiner* — Dave Czekaj
*Assistant Examiner* — Tracy Li
(74) *Attorney, Agent, or Firm* — Jeffrey D. Carter

(57) ABSTRACT

The invention is related to prediction of a lost or damaged block of an enhanced spatial layer frame.

A method for predicting a lost or damaged block of an enhanced spatial layer frame comprises the steps of determining an adjuvant frame in the enhanced spatial layer by help of reference information from a lower spatial layer frame corresponding said enhanced spatial layer frame, generating an information reduced block by help of said adjuvant frame and predicting the lost or damaged block by help of the information reduced block.

The reference information of the corresponding lower spatial layer frame can be decoded independently from any lower spatial layer reference frame and the adjuvant enhanced spatial layer frame is already decoded. Thus, the computational effort is reduced. By generation of the information reduced block the prediction is made smoother which makes it less vivid and therefore less salient to a user.

5 Claims, 6 Drawing Sheets

(56) References Cited

U.S. PATENT DOCUMENTS

| | | | |
|---|---|---|---|
| 7,864,849 B2* | 1/2011 | Park et al. | 375/240.13 |
| 2002/0041632 A1* | 4/2002 | Sato et al. | 375/240.25 |
| 2002/0071486 A1* | 6/2002 | Van Der Schaar et al. | 375/240.01 |
| 2005/0036558 A1* | 2/2005 | Dumitras et al. | 375/240.29 |
| 2005/0163211 A1* | 7/2005 | Shanableh | 375/240.1 |
| 2006/0165302 A1* | 7/2006 | Han et al. | 382/240 |
| 2007/0086518 A1* | 4/2007 | Jeon et al. | 375/240.1 |
| 2007/0171969 A1* | 7/2007 | Han et al. | 375/240.1 |
| 2007/0211798 A1* | 9/2007 | Boyce et al. | 375/240.16 |
| 2007/0230566 A1 | 10/2007 | Eleftheriadis et al. | |
| 2008/0165848 A1* | 7/2008 | Ye et al. | 375/240.13 |
| 2009/0220004 A1* | 9/2009 | Cieplinski et al. | 375/240.16 |
| 2009/0290637 A1* | 11/2009 | Lai et al. | 375/240.02 |

FOREIGN PATENT DOCUMENTS

| | | |
|---|---|---|
| JP | 2007096461 | 4/2007 |
| WO | WO 2004/064396 A1 | 7/2004 |
| WO | WO2004064396 | 7/2004 |
| WO | WO 2006/134525 A1 | 12/2006 |

OTHER PUBLICATIONS

Ying Chen et al: "Frame Losss Error Concealment for SVC" jouirnal of zhenjiang university sceince a.; an international applied phsics & Engineering Journal, Springer, Berlin, DE, vol. 7, No. 5, May 1, 2006, pp. 667-683, XP019385027 ISSN: 1862-1775 *p. 679, col. 2, line 20-line 35*.

Chen Y. et al.: SVC Frame Loss Concealment: Video Standards and Drafts, No. JVT-q046, Oct. 12, 2005, XP030006207 *p. 2, Line 17-Line 24*.

Markus Friebe and Andre Kaup et al.: 3D-deblocking for error concealment in block-based video decoding systems: 25. Picture Coding Symposium; Apr. 24, 2006-Apr. 26, 2006; beijing, Apr. 24, 2006, XP030080302 *Abstract* *p. 2, col. 1, Line 19-Line 23 *Section 3*.

* cited by examiner

METHOD FOR PREDICTING A LOST OR DAMAGED BLOCK OF AN ENHANCED SPATIAL LAYER FRAME AND SVC-DECODER ADAPTED THEREFORE

This application claims the benefit, under 35 U.S.C. §119, of European Patent Application No. 08305451.0 filed Aug. 6, 2008.

FIELD OF THE INVENTION

The invention is related to prediction of a lost or damaged block of an enhanced spatial layer frame.

Scalable video coding (SVC) is an approach towards provision of same content in different qualities in a single video stream. The difference in quality may be related to temporal resolution, to spatial resolution or to signal-to-noise resolution.

In spatial scalable video coding, image frames of a video are encoded in a spatial base layer and one or more enhanced spatial layers. While the base layer provides a low resolution version of the video frames, the enhanced spatial layers carry higher resolution versions of the same content.

If a block is lost or damaged, motion information needed for prediction and/or residual information is lost or damaged.

Residual information of a lost or damaged block of an enhanced spatial layer frame may be approximated by up-scaling a residual of a collocated block from a corresponding lower spatial layer frame.

Similarly, a prediction of the lost or damaged enhanced layer block may be approximated by up-scaling a prediction of a collocated block from a corresponding lower spatial layer frame.

But, if a device is in general capable for receiving and decoding a certain enhanced spatial layer frame, frames of layers lower than said certain enhanced spatial layer frames are not decoded. Thus, in case of data loss a prediction of the corresponding lower spatial layer frame need to be determined, first. This works well if the corresponding lower spatial layer frame is intra-predicted. But, if the corresponding lower spatial layer frame is inter-predicted by help of a reference frame which itself is inter-predicted by help of another—possibly also inter-predicted—reference frame, decoding of said corresponding lower spatial layer frame is time-consuming.

There is an ongoing effort in the art to improve the prediction of lost or damaged enhanced spatial layer blocks.

SUMMARY OF THE INVENTION

The invention engages in this effort and proposes a method for predicting a lost or damaged block of an enhanced spatial layer frame wherein said method comprises the features of claim 1.

Said method comprises the steps of determining an adjuvant frame in the enhanced spatial layer by help of reference information from a lower spatial layer frame corresponding said enhanced spatial layer frame, generating an information reduced block by help of said adjuvant frame and predicting the lost or damaged block by help of the information reduced block.

The reference information of the corresponding lower spatial layer frame can be decoded independently from any lower spatial layer reference frame and the adjuvant enhanced spatial layer frame is already decoded. Thus, the computational effort is reduced. By generation of the information reduced block the prediction is made smoother which makes it less vivid and therefore less salient to a user.

In an embodiment, the method further comprises generating an information reduced frame by help of said adjuvant frame and determining the information reduced block within the information reduced frame by help of motion information from a lower layer block of said lower spatial layer frame which corresponds to said lost or damaged block.

Said embodiment of the method may further comprise generating the information reduced frame by down-scaling the adjuvant frame to said lower spatial layer.

And, said embodiment may further comprises combining the information reduced block with a residual of said corresponding lower layer block, up-scaling the combination to said enhanced spatial layer and concealing the lost or damaged block by help of the up-scaled combination.

In a further embodiment, the method further comprises up-scaling said motion information to the enhanced spatial layer, determining an adjuvant block in said adjuvant frame by help of said up-scaled motion information and removing detail information from said adjuvant block while maintaining an enhanced spatial resolution.

In yet a further embodiment, the method may further comprise that an information reduced frame is generated with enhanced spatial resolution by removing detail information from the adjuvant frame and that determining the information reduced block comprises up-scaling said motion information to the enhanced spatial layer.

The further embodiment and/or the yet a further embodiment may also comprise up-scaling the residual of said corresponding lower layer block to said enhanced spatial layer, combining the information reduced block with the up-scaled residual and concealing the lost or damaged block with the combining result.

The invention further proposes an SVC-decoder adapted for predicting a lost or damaged block of an enhanced spatial layer frame in accordance with the description herein.

That is, said SVC-decoder comprises means for determining an adjuvant frame in the enhanced spatial layer by help of reference information from a lower spatial layer frame corresponding said enhanced spatial layer frame, a block generator for generating an information reduced block by help of said adjuvant enhanced frame and means for predicting the lost or damaged block by help of the information reduced block.

Said SVC-decoder may be embodied such that it further comprises means for generating an information reduced frame from said adjuvant frame and means for determining the information reduced block within said information reduced frame by help of motion information from a lower layer block of said lower spatial layer frame which corresponds to said lost or damaged block.

In another embodiment of the SVC-decoder the generating means are adapted for down-scaling said adjuvant frame to said lower spatial layer.

The SVC-decoder may further comprise means for combining the adjuvant block with a residual of said lower layer block and up-scaling means for up-scaling the combination result from the lower spatial layer to the enhanced spatial layer wherein the SVC-decoder is adapted for concealing the lost or damaged block by help of the up-scaled combination result.

Or, the SVC-decoder may further comprise means for up-scaling said motion information to the enhanced spatial layer, means for determining an adjuvant block in said adjuvant frame by help of said up-scaled motion information and a filter for removing detail information of said adjuvant block.

Alternatively, the SVC-decoder may further comprise means for up-scaling said motion information to the enhanced spatial layer, a filter for removing detail information of said adjuvant frame and means for determining the information reduced block in said filtered adjuvant frame by help of said up-scaled motion information.

For adapting the SVC-decoder for concealing the lost or damaged block, it may further comprise means for up-scaling a residual of the lower spatial layer to said enhanced spatial layer, means for combining the up-scaled residual with the information reduced block wherein the SVC-decoder is adapted such that the lost or damaged block is concealed by help of the combination result.

The proposed method and/or the proposed SVC-decoder are especially useful if said lower spatial layer frame is an inter-predicted frame referencing another inter-predicted frame of the lower spatial layer.

BRIEF DESCRIPTION OF THE DRAWINGS

Exemplary embodiments of the invention are illustrated in the drawings and are explained in more detail in the following description.

In the figures.

DETAILED DESCRIPTION OF THE INVENTION

Figure 1:
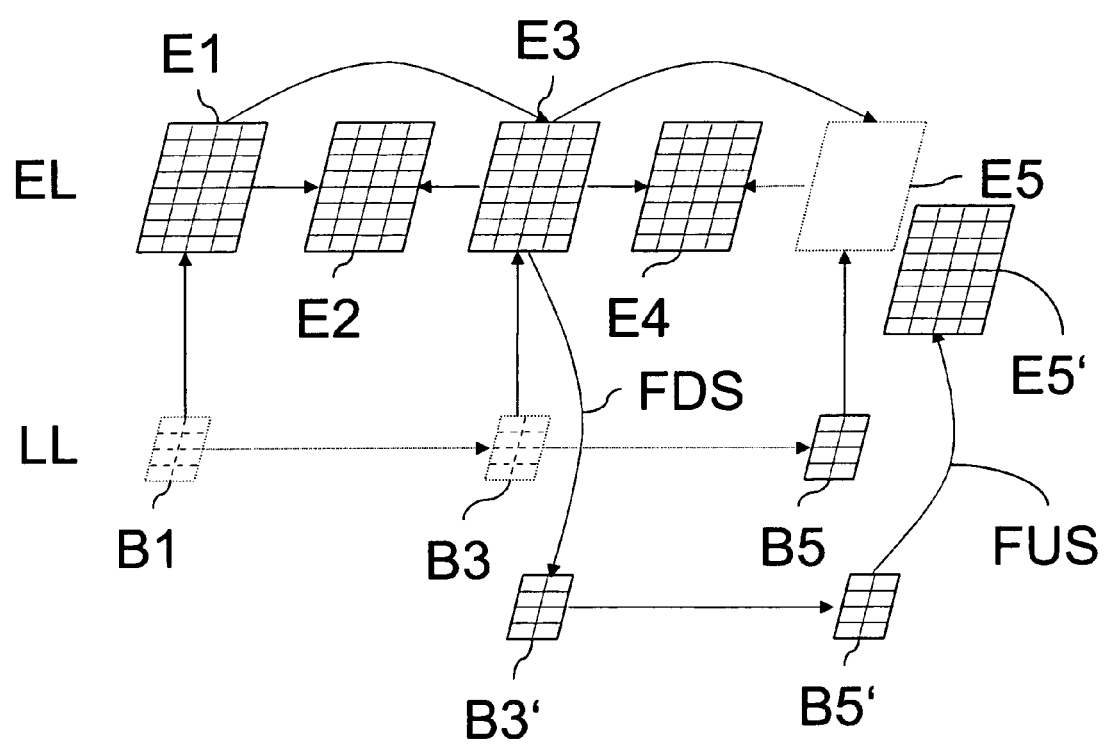
FIG. 1 depicts an exemplary first embodiment of error concealment in an exemplary SVC coding structure with two spatial layers.

An exemplary first SVC coding structure with error concealment is depicted in FIG. 1. The figure shows an enhanced layer EL comprising the image frames E1, E2, E3, E4 and E5 and a lower layer LL which comprises the images frames B1, B3 and B5.

The enhanced layer EL is spatially as well as temporarily enhanced. That is, frames E1, E3 and E5 comprise the same content as frames B1, B3 and B5 but at a higher spatial resolution as indicated by the number of quadrangles comprised in the frames. Furthermore, the enhanced layer EL provides the same content with a higher temporal resolution as it comprises the frames E2 and E4 for which no corresponding lower layer frame is comprised in the lower layer LL.

Assumed that picture E5 is lost or damaged, as indicated by the dashed line, picture E5 may be replaced by an up-scaled version of picture B5. If frame B5 is intra-predicted reconstructing it is fast and feasible.

But, if picture B5 is inter-predicted by help of picture B3, reconstruction of picture B5 requires decoding picture B3, first.

Instead of decoding frame B3, the already decoded frame E3 which comprises the same content as B3 with a higher spatial resolution may be downscaled FDS resulting in an approximation B3' of frame B3. Said approximation B3' may than used as reference frame together with motion information of frame B5 for generation of another approximation B5' which approximates frame B5.

Said another approximation B5' is up-scaled FUS which results in a further approximation E5' said further approximation E5' approximating frame E5. Blocks of the further approximation E5' may than be used for concealing missing or damaged blocks of frame E5, for instance by replacing frame E5 by the further approximation E5'.

Figure 2:
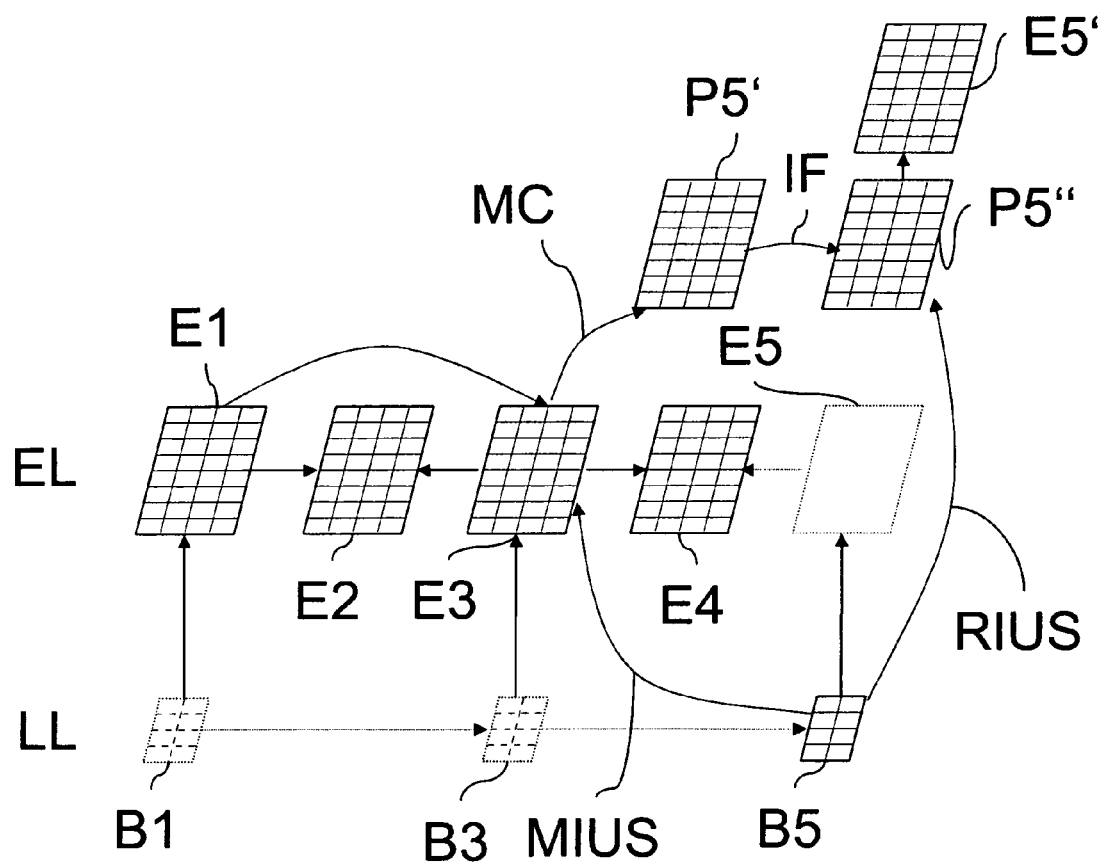
FIG. 2 depicts an exemplary second embodiment of error concealment in an exemplary SVC coding structure with two spatial layers.

As depicted in FIG. 2, the approximation E5' may also be generated by up-scaling motion information MIUS and up-scaling of residual information RIUS. The up-scaled motion information is used to determine a reference block in frame E3. Said reference block comprised in frame E3 is then motion compensated MC and then filtered IF for removing detail information.

If the entire enhanced layer frame E5 is lost an approximate prediction P5' may be determined by help of up-scaled motion information MIUS and the frame E3.

Approximate prediction P5' is then information filtered IF which results in filtered prediction P5". By help of up-scaled residual information and the filtered prediction P5" the concealment E5' of lost frame E5 is determined.

Figure 3:
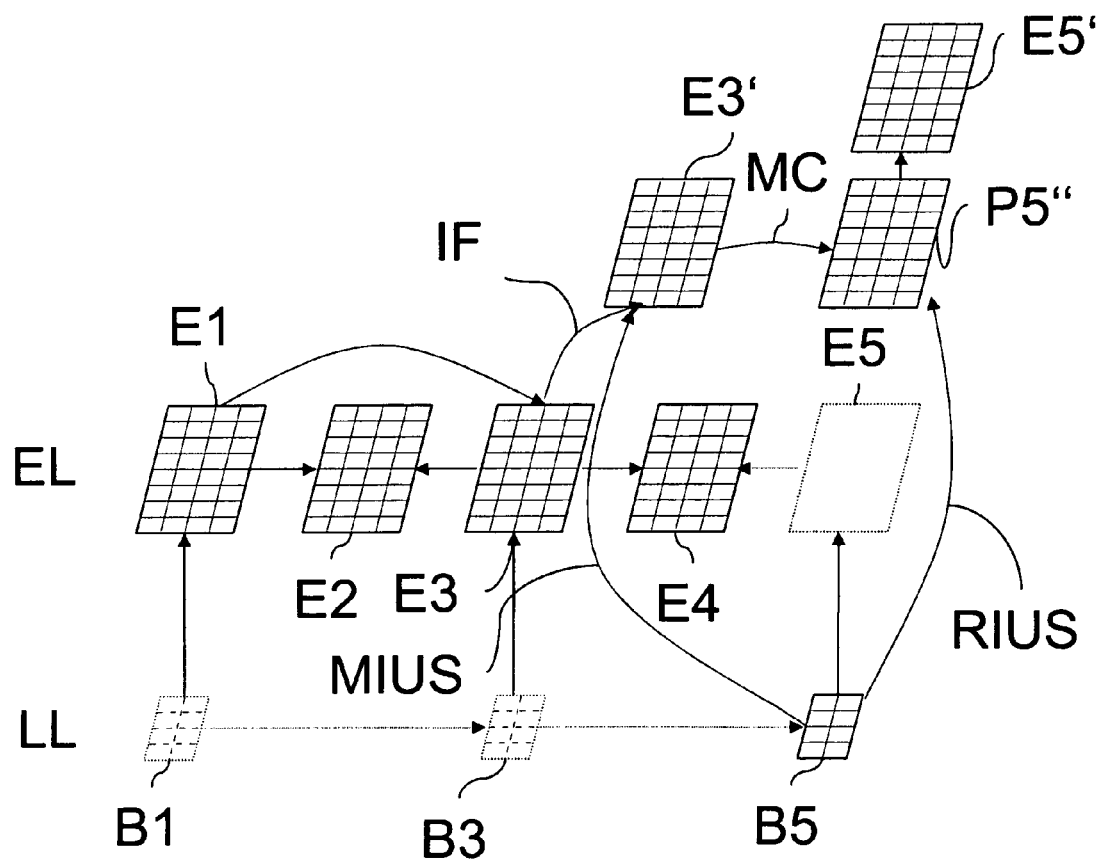
FIG. 3 depicts an exemplary third embodiment of error concealment in an exemplary SVC coding structure with two spatial layers.

Or, the information in frame E3 is filtered IF first, yielding filtered frame E3' as depicted in FIG. 3. Then, motion compensation by help of the up-scaled motion information is performed which results in the filtered prediction P5".

Figure 4:
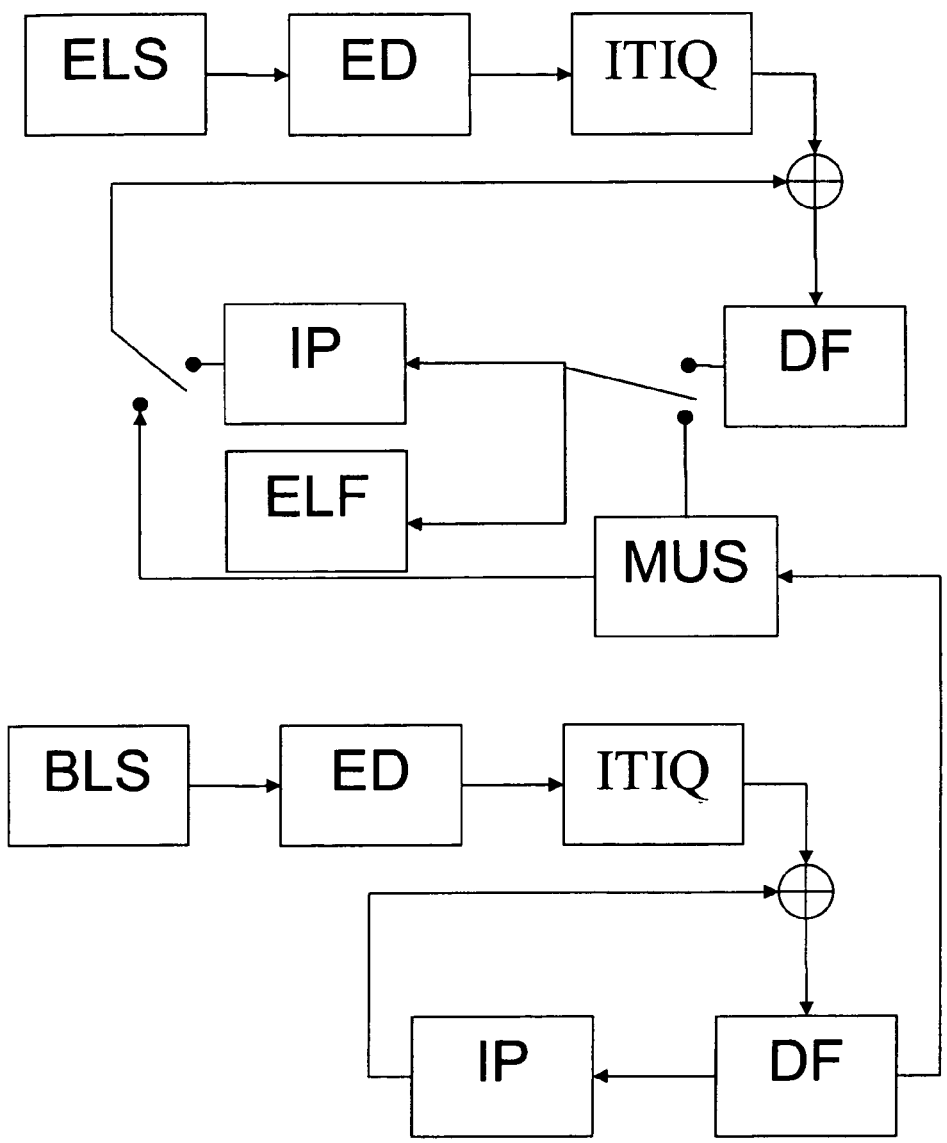
FIG. 4 depicts an exemplary framework for error concealment by help of an intra-predicted lower spatial layer frame.

FIG. 4 depicts an exemplary framework for error concealment by help of an intra-predicted lower spatial layer frame.

An enhanced layer stream ELS is received and entropy decoded by an entropy decoder ED. The entropy decoded output is inverse transformed and inverse quantized in an inverting module ITIQ. The output of the module ITIQ is an enhanced layer residual which is combined with an intra-prediction being outputted by an intra-predicting module IP. Or, the enhanced residual output by module ITIQ is combined with an inter-layer intra prediction block, i.e, an up-sampled lower layer block.

The result of said combination is filtered by a deblocking filter DF. In normal, undisturbed operation, the result of the deblocking filter DF is output as the decoded enhanced layer frame ELF.

In case of any impairment of an enhanced layer block with base_mode_flag equal to 1, a lower layer decoding circuit comes in action. As for the enhanced layer stream ELS, a lower layer stream BLS is received and entropy decoded ED. The entropy decoded output is inverse transformed and inverse quantized ITIQ. Then, it is combined with a lower layer intra-prediction being outputted by intra-predicting module IP. The combination is filtered DF. The filtering result is up-scaled MUS and the up-scaling result is the used instead of the missing or damaged enhanced layer block.

The up-scaled result is outputted as part of the enhanced layer frame ELF. And, it is used for intra-prediction of another enhanced layer block.

Figure 5:
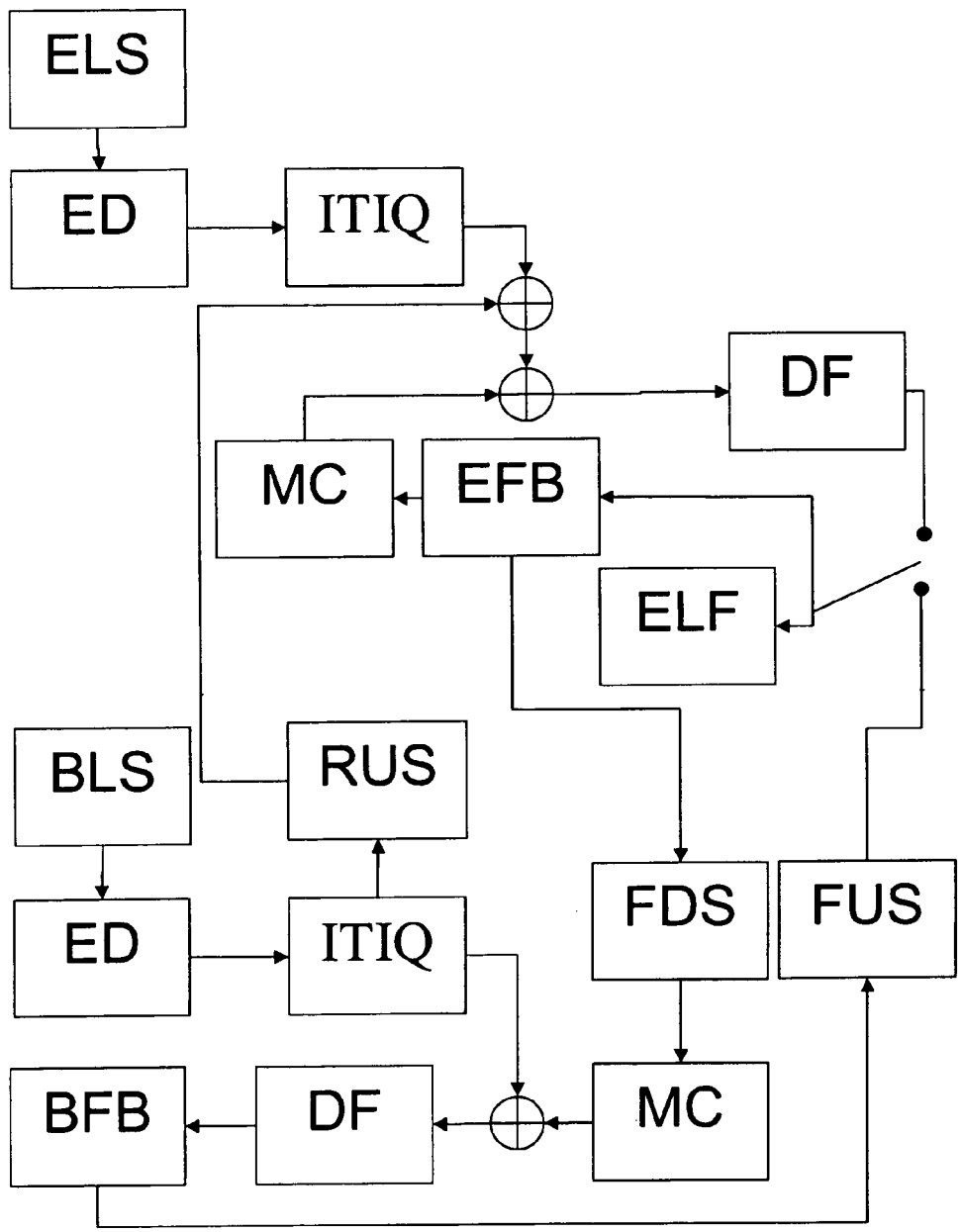
FIG. 5 depicts an exemplary framework for error concealment by help of an inter-predicted lower spatial layer frame and FIG. 6 depicts an exemplary flowchart of enhanced spatial layer error concealment.

FIG. 5 depicts an exemplary framework for error concealment by help of an inter-predicted lower spatial layer frame.

As in FIG. 4, an encoded inter-predicted block from the enhanced layer stream ELS is received, entropy decoded ED, inverse transformed and inverse quantized ITIQ. The result is combined with a motion compensated block being outputted by motion compensation module MC.

The motion compensation module MC accesses an enhanced layer frame buffer EFB which contains preceding frames, either already decoded enhancement layer frames, or generated approximations of enhancement layer frames.

In case of error concealment a frame from the buffer EFB is down-scaled in module FDS and used for motion compensation MC in the lower layer.

The down-scaled and motion-compensated frame is then combined with a lower layer residual and the combination result is de-blocked in de-blocking filter DF. The result is fed to a lower layer frame buffer BFB from which a lower layer block approximation corresponding a missing or damaged enhanced layer block is taken. The lower layer block approximation is up-scaled to the enhanced spatial layer in a block or frame up-scaling module FUS. Then, the up-scaled lower layer block approximation is output as part of the decoded enhanced layer frame ELF. The up-scaled lower layer block approximation is further stored in the enhanced lower frame buffer EFB from where it may be retrieved if a block references the lost or damaged enhancement layer block.

Figure 6:
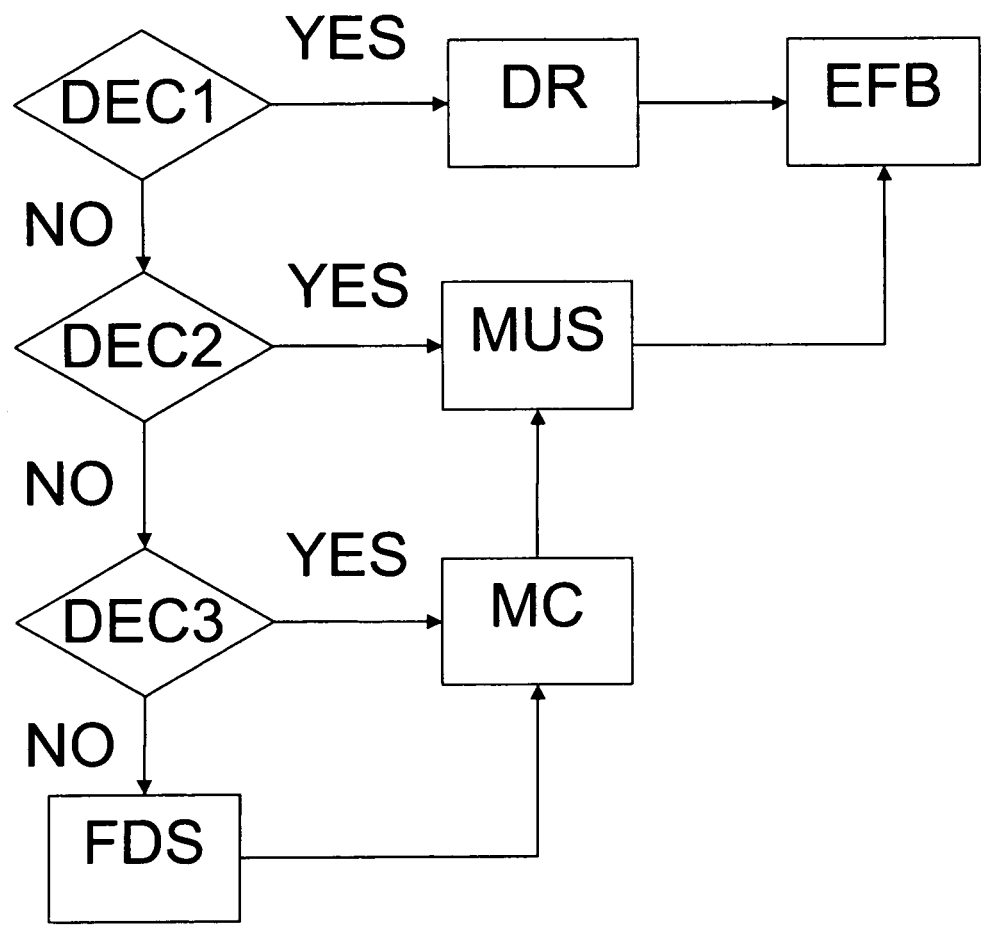

FIG. 6 depicts an exemplary flowchart of enhanced spatial layer error concealment.

In a first decision step DEC1 it is decided whether a block received in an enhanced layer video bit stream can be decoded. If so, it is decoded and rendered in step DR and then passed to the enhanced layer frame buffer EFB from where it is outputted.

If the received block cannot be decoded, it is decided in a second decision step DEC2 whether a collocated block in a corresponding lower layer frame is intra predicted. If so, said lower layer block is up-sampled in step MUS to the enhanced layer and passed to the enhanced layer frame buffer EFB.

If the collocated lower layer block is inter predicted, it is decided in a third decision step DEC3 whether a lower layer reference picture's block which referenced for the inter prediction of the collocated lower layer block is intra predicted. If so, said collocated lower layer block is reconstructed by motion compensating the referenced lower layer block and combining the motion compensated referenced block with the residual of the collocated lower layer block. The result is up-sampled in step MUS to the enhanced layer and passed to the enhanced layer frame buffer EFB.

If the referenced lower layer block is inter predicted as well, the enhanced layer picture which corresponds to the lower layer reference picture is down-sampled in step FDS to the lower layer. A block of the down-sampled enhanced layer picture which is collocated with the inter-predicted lower layer reference block is then used instead of said referenced lower layer block for reconstructing the collocated lower layer block by help of motion compensation and combining with the residual of the collocated lower layer block. Again, the result is up-sampled in step MUS to the enhanced layer and passed to the enhanced layer frame buffer EFB.

Instead of down-sampling said corresponding enhanced layer picture to the lower layer, the motion information and the residual of the collocated lower layer block may be up-sampled to the enhanced layer. Then an approximation of the received block which cannot be decoded can be generated by help of the up-sampled motion information, the up-sampled residual and by help of a block of the corresponding enhanced layer picture which is collocated with the inter-predicted lower layer reference block. Said block of the corresponding enhanced layer picture is first motion compensated and then filtered. Or, said block of the corresponding enhanced layer picture is first filtered and then motion compensated. The filtering is done such that the block is smoothed through removal of detail information in a way which corresponds to information reduction due to the down-sampling.

The enhanced spatial layer and the lower spatial layer need not to be adjacent to each other. That is, there may be one or more intermediate spatial layers between the two wherein said intermediate spatial layers have intermediate spatial resolutions which are higher than the lower layer spatial resolution but smaller then than the enhanced layer spatial resolution.

What is claimed is:

1. A method for concealing a lost or damaged block of an enhanced spatial layer frame, said method comprising:
   using reference information from a lower spatial layer frame corresponding to said enhanced spatial layer frame for determining a reference frame in an enhanced spatial layer, said reference frame having a timestamp different from a timestamp of said enhanced spatial layer frame comprising said lost or damaged block;
   down-scaling said reference frame;
   obtaining a lower spatial layer frame approximation of said lower spatial layer frame by motion-compensating said down-scaled reference frame using motion information which corresponds to said lower spatial layer frame;
   obtaining a residual of said lower spatial layer frame, which corresponds to said lost or damaged block;
   obtaining a resulting frame by combining said lower spatial layer frame approximation with said residual of said lower spatial layer frame; and
   concealing said lost or damaged block of said enhanced spatial layer frame by upscaling a lower layer block approximation of said resulting frame.

2. The method according to claim 1, wherein said lower spatial layer frame is an inter-predicted frame referencing another inter-predicted frame of the lower spatial layer.

3. A video decoder, comprising a hardware processor configured for:
   using reference information from a lower spatial layer frame corresponding to an enhanced spatial layer frame for determining a reference frame in an enhanced spatial layer, said reference frame having a timestamp different from a timestamp of said enhanced spatial layer frame comprising a lost or damaged block;
   down-scaling said reference frame;
   obtaining a lower spatial layer frame approximation of said lower spatial layer frame by motion-compensating said down-scaled reference frame using motion information which corresponds to said lower spatial layer frame;
   obtaining a residual of said lower spatial layer frame which corresponds to said lost or damaged block;
   obtaining a resulting frame by combining said lower spatial layer frame approximation with said residual of said lower spatial layer frame; and
   upscaling a lower layer block approximation of said resulting frame.

4. The video decoder according to claim 3, wherein said lower spatial layer frame is an inter-predicted frame referencing another inter-predicted frame of a lower spatial layer.

5. The video decoder according to claim 3, wherein said video decoder is an SVC-type decoder.

* * * * *